Nov. 10, 1953
R. E. AMUNDSEN
2,658,279
SELF-CONTAINED DRAFTING INSTRUMENT
Filed April 29, 1950
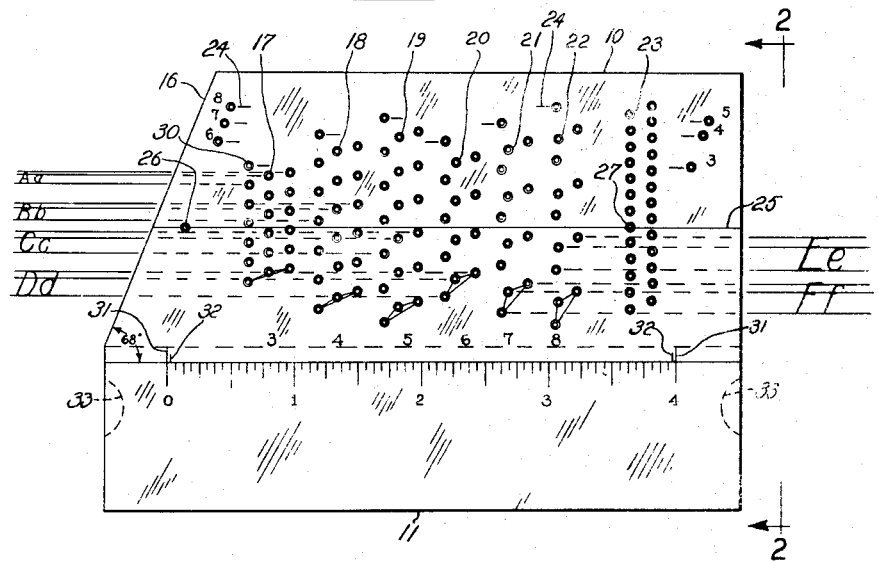
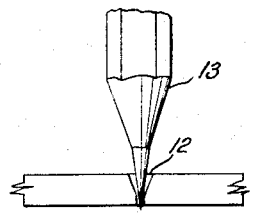
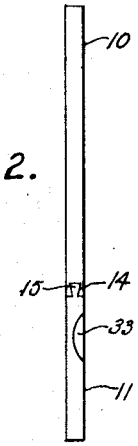
INVENTOR.
Roy E. Amundsen
BY
Cook and Ackermeshorn
ATTORNEYS Patented Nov. 10, 1953

2,658,279

UNITED STATES PATENT OFFICE 2,658,279

SELF-CONTAINED DRAFTING INSTRUMENT

Roy E. Amundsen, Portland, Oreg.

Application April 29, 1950, Serial No. 159,022

5 Claims. (Cl. 33—104)

This invention relates to a drafting instrument which may be used as a lettering guide or guide for hatch or slope lines and the like.

An important object of the invention is the provision of a drafting instrument which may be used by itself without other guiding instruments such as a T-square or triangles.

Another object is the provision of aligning means on the instrument for orienting the instrument with an established line along which it is desired to do lettering.

Another object is to provide a drafting instrument provided with a scale and cooperating index marks to assist in spacing hatch or slope lines.

Another object is to provide means to easily grasp the instrument to lift it from the drafting board.

A further object of the invention is to provide a drafting instrument having means for aligning the instrument with established guide lines and for drawing said lines and other lines to an indefinite length.

The drafting device preferably is made of two pieces of transparent material held in sliding engagement with each other by means of a dovetail joint extending the full length of the engaging edges. One member of the device is provided with a plurality of countersunk guide holes arranged in spaced relation and in predetermined pattern and into which a pencil may be inserted and guide lines drawn therethrough. The dovetail joint provides a sliding interlock which permits guide lines to be drawn through any of the plurality of guide holes by movement of the upper member or by alternate movement of the two members, and for such a device it is not necessary to provide a straight-edge support such as by means of a conventional T-square or triangles. Aligning holes and an offset reference line are spaced on the instrument so that the instrument can be aligned with any line on a map or drawing and guide lines drawn on either side of the reference line accurately and to an indefinite length. The lower member is provided with a scale on its upper surface, and a feature of such scale is that it provides a means for spacing hatch lines drawn along either end of the upper member. The lower member of the device is provided with semi-circular grooves on the under surface of the side edges so that the instrument may conveniently be grasped when it is desired to raise it from the drafting surface.

The invention will be better understood and additional objects and advantages will become apparent from the following description in connection with the accompanying drawings illustrating a preferred embodiment of the invention. It is to be understood, however, that the invention may take other forms, and all such modifications within the scope of the appended claims are included in the invention.

In the drawings:

Figure 1 is a top plan view showing a drafting instrument constructed according to the principles of the instant invention;

Figure 2 is an edge view of the instrument taken on the line 2—2 of Figure 1, showing the dovetail joint forming a sliding interlock between the upper and lower members; and Figure 3 is a cross sectional view showing the detail of construction of one of the guide holes.

In Figures 1 and 2 there is shown a drafting instrument which may preferably be made from transparent material such as Celluloid, plastic, or other material which is inexpensive to manufacture and is durable for use on the drafting board. The instrument is made of two parts interlocked together by a joint permitting relative or alternate movement of the parts. The sliding interlock between the parts may be of any appropriate construction and of any suitable material. As shown in the drawings, the upper member 10 is provided with a mortise 14 on its lower edge which receives a tenon 15 formed on the top edge of the lower member 11. The two members are thus slidable relative to each other and are so interlocked as to promote accuracy in the drawing of guide lines when moved relative to each other. The device may be disassembled and the two pieces used as separate instruments. For example, the upper member 10 may be used in conjunction with a T-square, and the lower member 11 used as a scale; but it is primarily intended that the device be used in assembled relation with the lower member acting as a support and scale for sliding movement of the upper member.

The upper member 10 of the instrument is constructed in generally rectangular shape as shown, having the left-hand edge 16 disposed at an angle of 68° or other predetermined angle to the horizontal for convenience in drawing hatch or slope lines. The upper member is provided with seven vertical columns of holes arranged in sets of three and designated by reference numerals 17 to 23, inclusive. The holes of each set in the vertical columns are so spaced that guide lines for lettering can be made to correspond to predetermined heights of capital and lower case letters. Numerals are provided in alignment with each column of holes and represent the distance between the top and bottom hole of each set of three holes in the column. In the device shown, the numerals represent the distance between the top and bottom holes in sixty-fourths of an inch. For example, the numeral 3 below the column of holes 17 represents 3/64 inch, and top and bottom guide lines drawn from any set of holes in that column will be spaced 3/64 inch to form letters of the height Aa. The numeral 4 below the column of holes 18 designates 4/64 inch and spaces the guide lines to form letters of the height Bb. Similarly, the numerals 5, 6, 7 and 8, below the columns of holes 19, 20, 21 and 22, represent the spacing of the guide lines in a similar manner to form letters shown as Cc, Dd, Ff, and Ee, respectively. The middle hole in each set of three holes is spaced vertically so that a line drawn through each middle hole is 0.7 the distance from the bottom to the top hole. Each set of three holes is so arranged that each middle hole is an equal distance from each of the other two holes in the set to provide for maximum strength of the material. Each of the holes provided in the instrument is countersunk as shown at 12 in Figure 3, wherein is shown a typical hole, so that a sharp pointed pencil 13 can be inserted and guide lines drawn therethrough. The bottom three holes of each vertical column are connected by a line as a guide for locating the holes in a desired set.

An important feature of the invention is the provision of aligning means so that the instrument can be aligned with reference points or a line on a drawing or a map, and then used to draw guide lines on either side of the line. Such guide lines may be drawn without the assistance of other drafting instruments, such as a supporting T-square or triangles.

The aligning means comprises a longitudinal reference line 25 provided on the under surface of the upper sliding member 10, and this line is darkened so as to be easily seen through the transparent instrument, and therefore easily aligned with reference points or a line on a map or drawing. Holes 26 and 27 lying on the reference line 25 assist in aligning the instrument to coincide with such reference points or the like. The reference line 25 is offset slightly below the center of the two aligning holes 26 and 27 because in drawing guide lines with a sharp pointed pencil, the pencil point rests against the bottom edge of the hole and the line is not drawn through the exact center of the hole. With the reference line 25 located slightly below the center of the two aligning holes, guide lines may be drawn accurately and not offset equal to the difference in distance between the center of the hole and a guide line made by a sharp pointed pencil resting against the bottom edge of a hole.

When the instrument is aligned on a drawing by using the reference line 25 or holes 26 and 27, it is apparent that at least two sets of guide lines may be drawn on either side of the reference line using any desired set of holes in the vertical columns 17—23. The line 25 is so arranged that it does not intersect any of the holes in the several columns and lies between individual sets of each column. If the guide line is to be of a length greater than the length of the instrument, the line may be drawn by first inserting a pencil in a desired hole and sliding the upper member 10 its maximum distance of sliding travel with respect to the lower member 11 without disassembling the two members. The lower member 11 is held firmly on the drafting board during such procedure. When the upper member reaches its limit of movement, it is held firmly while the lower member is moved in the same direction to again provide a sliding support for upper member 10. Such alternating of the two members thus provides a means for drawing guide lines of indefinite length and means for drawing guide lines without additional supporting instruments.

Other holes, 3 to 8, inclusive, on the upper right- and left-hand corners of the instrument correspond to an uppermost hole in each of vertical columns of holes. As an example, hole No. 3 on the right-hand side of the instrument is longitudinally aligned with hole 30 at the upper end of the column of holes designated by the numeral 17. Each of the vertical columns of holes is thus provided with an uppermost hole used for aligning means in conjunction with holes 3 to 8 on the right- and left-hand sides of the instrument. The instrument can be aligned by means of these pairs of holes with a reference line of a map or the like, or a previously drawn set of guide lines, and such aligning means allows a maximum number of guide lines to be drawn beneath the starting line, as is used in general drafting work. Alignment of the holes 3 to 8, inclusive, on the upper right- and left-hand corners of the instrument with the uppermost holes of correspondingly numbered columns is enhanced by a line 24 protruding slightly from each aligning hole in a horizontal direction toward its mating hole.

The vertical column of holes designated by the numeral 23 is for drawing equally spaced, parallel lines. The holes of each of the two rows are in staggered relation so that parallel lines of small or large spacing may be drawn. As an example, the holes may be spaced a distance of 1/8 inch apart in each row, and as the holes in the two rows are staggered, guide lines spaced 1/16 inch may be conveniently drawn. It is evident that guide lines in multiples of 1/16 inch may also be drawn by using the proper holes of the two rows.

The lower member 11 of the instrument is provided with a scale in inches, and on the instrument shown in Figure 1 a 4-inch scale is provided which is graduated to 16ths of an inch. Index marks 31 and 32 near each end of the upper member 10 are used in conjunction with the scale to evenly space hatch or slope lines. When it is desired to draw hatch or slope lines 1/16 inch apart, the upper member and index 31 are merely moved, after each line is drawn along the edge 16 of upper member 10, to the next graduation mark on the scale, thus providing evenly spaced lines. If it is desired to draw hatch or slope lines 1/32 inch apart, a line is first drawn using index mark 31 aligned with any graduation mark on the lower scale. The upper member 10 is then moved so that index mark 32 will be opposite the next adjacent mark and the line drawn. By repeating this operation, it is seen that hatch or slope lines can be spaced various distances apart accurately and without the aid of separate instruments as T-squares, triangles, or other additional drafting instruments.

The lower member 11 of the instrument is provided with semi-circular groove portions 33 so that the instrument may be conveniently grasped and raised from the drafting board. The device may be raised by grasping one of the grooves with a finger or fingernail and lifting while holding the opposite edge of the instrument from sliding.

While the invention may be used by itself without the use of supporting instruments, it is evident that it may be used with other instruments in the drawing of guide lines, hatch lines, slope lines, parallel lines, or the like. Vertical lines can be drawn by turning the instrument end for end and using the straight, vertical edge. Also, guide lines may be drawn for general drafting work since the spacing of the sets of holes in the vertical columns has not been broken by the longitudinal reference line 25, and since alignment can be made with top holes, each set can be repeated to make as many horizontal lines as desired.

Having now described my invention and in what manner the same may be used, what I claim as new and desire to protect by Letters Patent is:

1. A drafting instrument comprising an upper member and a lower member, said upper member having a plurality of vertical columns of holes and a single hole above each of said columns, and holes lying adjacent the side edges of said upper member in longitudinal alignment with said uppermost holes in said vertical columns for aligning the instrument to coincide with an established reference line.

2. In a drafting instrument, a plurality of vertical columns of holes identified by numerals, a single hole on the top of each of said vertical columns, and holes lying adjacent the side edges of said instrument and being identified by the same sequence of numbers as said first mentioned holes, the holes on top of said vertical columns being in horizontal alignment with its correspondingly numbered hole adjacent the side edge, all of said holes having a short visible guide line extending toward its horizontally aligned hole for convenience in aligning the instrument on an established reference line.

3. In a drafting instrument having an upper member and a lower member slidably interconnected, a plurality of vertical columns of holes in said upper member identified by numerals, a single hole on top of each of said vertical columns, and holes lying adjacent the side edges of said upper member and being identified by the same sequence of numbers as said first mentioned holes, the holes on top of said vertical columns being in horizontal alignment with its correspondingly numbered hole adjacent the side edge to align the instrument with an established reference line and draw parallel guide lines below said reference line upon sliding movement of said upper member relative to said lower member.

4. A drafting instrument comprising an upper member and a lower member, said upper member being provided with a longitudinal guide line and holes lying on opposite ends of said guide line for aligning the instrument to coincide with an established reference line, a plurality of vertical columns of holes extending across said guide line, said vertical columns comprising sets of holes spaced from said guide line for drawing lines in sets equally spaced on each side of said reference line, and holes positioned adjacent the side edges of said upper member in longitudinal alignment with holes in said vertical columns for aligning the instrument with said reference line.

5. In a drafting instrument, a plurality of sets of holes having three holes in each set with the sets of holes arranged in columns for drawing sets of parallel lines, each column being three holes in width, and a visible guide line extending perpendicular to said columns, the holes of each set of holes being differently spaced from the guide line, said guide line lying intermediate the extremities of said columns and between said individual sets of holes in said columns so that said parallel lines corresponding to the holes in each of said sets can be drawn on each side thereof when said guide line is aligned with an established reference line.

ROY E. AMUNDSEN.

References Cited in the file of this patent

UNITED STATES PATENTS

| Number | Name | Date |
|---|---|---|
| 1,692,149 | Castan | Nov. 20, 1928 |

FOREIGN PATENTS

| Number | Country | Date |
|---|---|---|
| 110,506 | Switzerland | June 16, 1925 |

OTHER REFERENCES

Publ.: Eugene Dietzgen Co. Catalog, copyright 1946, page 287.